No. 874,630. PATENTED DEC. 24, 1907.
G. H. SOHN.
THIRD RAIL ATTACHMENT FOR ELECTRIC CARS.
APPLICATION FILED JUNE 10, 1907.
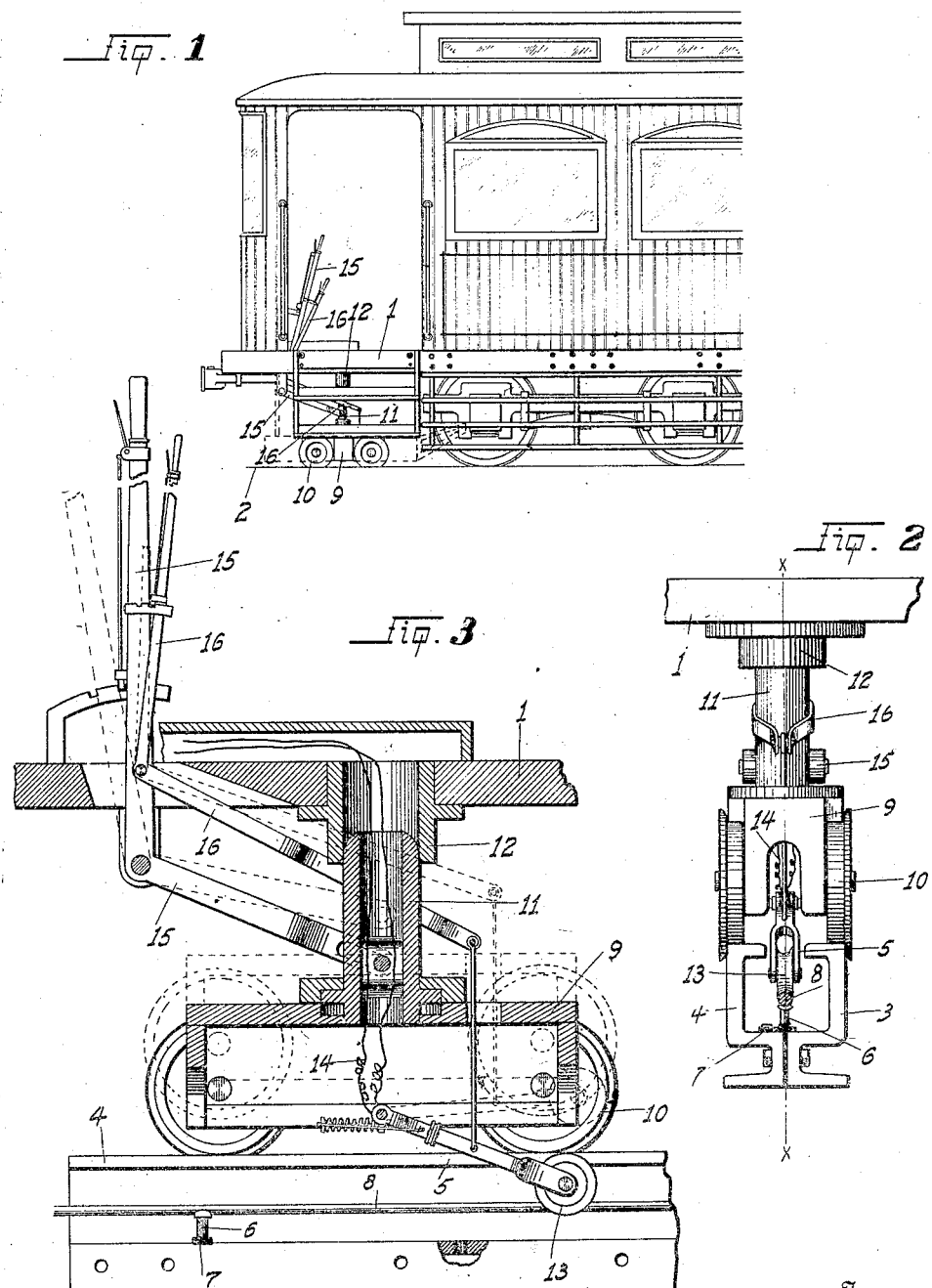

UNITED STATES PATENT OFFICE.

GEORGE H. SOHN, OF LINCOLN, CALIFORNIA.

THIRD-RAIL ATTACHMENT FOR ELECTRIC CARS.

No. 874,630.  Specification of Letters Patent.  Patented Dec. 24, 1907.

Application filed June 10, 1907. Serial No. 378,152.

*To all whom it may concern:*

Be it known that I, GEORGE H. SOHN, a citizen of the United States, residing at Lincoln, in the county of Placer and State of California, have invented certain new and useful Improvements in Third-Rail Attachments for Electric Cars; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in railways and particularly to electric railways, my object being to produce a third rail attachment for electric cars whereby the cost of operation may be materially lessened and also whereby the loss of life may be reduced and other damage usually caused by the present third rail system may be obviated. This object I accomplish by means of a hollow rail provided with a longitudinal slot in the top thereof, a current carrying wire disposed in said rail, and a trolley attachment secured to the bottom of the car and engaging with said wire. Also by a lever means for raising and lowering said trolley at will and by such other and further construction as will appear by a perusal of the following specification and claims.

On the drawings similar characters of reference indicate corresponding parts in the several views.

Figure 1 is a view of one end of a car showing my improved device installed thereon. Fig. 2 is an end elevation of my device. Fig. 3 is a longitudinal section of my device.

Referring more particularly to the reference numerals on the drawings 1 designates a car running on its usual rails 2. Intermediate said rails 2 is a hollow rail formed of two pieces 3 and 4 suitably bolted together and provided with a longitudinal slot 5 in the top thereof. Disposed in said rail are upright standards 6 insulated from the rail by suitable insulations 7 secured to one of the parts 3 or 4. Held upward by said standards 6 is a current carrying cable 8.

9 designates a small dummy car having flanged wheels 10 adapted to run on the rail 3—4, said car being hollow inside and having a hollow tube 11 swiveled on the top thereof, said tube extending within a tube 12 on the bottom of the car 1. Pivotally mounted within the car 9 is a trolley wheel 13 similar to those used on electric cars and which engages the cable 8 for the purpose as will appear. From the trolley 13 wires 14 lead through the tube 11 to the controller and other machinery. Pivotally connected to the car 9 is a lever mechanism 15 which extends to the motorman's position in the car 1. Connected to the trolley 13 is a lever mechanism 16 pivoted on the lever mechanism 15 for the purpose as will appear.

In practice the current is turned into the wire 8 and the trolley 13 dropped thereon, the wheels 10 riding on the rail 3—4. Thus the current travels through the trolley 13 and wires 14 to the controller and hence to the motor of the car. When it is desired for any reason to raise the trolley 13 from the wire 10 the lever 16 is operated, which action lifts the trolley 13 clear of the slot 5. Also if for any reason it is desired to lift the car 9 from the rail 3—4, then the lever 15 is operated which lifts the car 9 clear of the track 3—4, and since the lever 16 is mounted on the lever 15, permits of the trolley 13 moving with the car 9 as it must in order to make a perfect movement.

Thus it will be seen that I have produced a new third rail attachment for electric cars which reduces the danger of destroying life to a minimum, and yet one which is simple and effective for the purpose for which it is designed.

While this specification sets forth in detail the present and preferred embodiment of my invention, still in practice such small deviations therefrom may be resorted to as fall within the scope of my claims.

Having thus described my invention, what I claim as new and useful and desire to secure by Letters Patent is:—

1. In a device of the character set forth, a hollow rail provided with a longitudinal slot in its upper face, a current carrying wire disposed in said rail, a dummy car carrying wheels normally running on said rail, a hollow tube upward from said car, an electric car, a tube on the under side of said electric car and telescoping said first named tube and means disposed within said dummy car and said tubes, conveying the current from said wire to said electric car, as set forth.

2. In a device of the character described a hollow rail provided with a longitudinal slot in its upper face, a current carrying wire disposed in said rail, a dummy car carrying wheels normally running on said rail, a trolley carried by said car engaging said wire, an electric car means connecting said dummy car to said electric car, and means for raising and lowering said trolley through said slot, as set forth.

3. In a device of the character described a hollow rail provided with a longitudinal slot in its upper face, a current carrying wire disposed in said rail, a dummy car carrying wheels running normally on said rail, a trolley pivotally mounted in said dummy car and normally engaging said wire, an electric car means connecting said dummy car to said electric car, means for raising and lowering said dummy car and means for raising and lowering said trolley, as set forth.

4. In a device of the character described a hollow rail provided with a longitudinal slot in its upper face, a current carrying wire disposed in said rail, a dummy car carrying wheels normally running on said rail, a hollow tube upward from said car, an electric car means slidably connecting said tube with the under side of an electric car, a trolley pivotally mounted within said dummy car and engaging normally with said wire, wires connected with said trolley and extending through said tube and hence to a point on said electric car, and means for raising and lowering said dummy car and said trolley, as set forth.

5. In a device of the character described, a dummy car, a hollow tube swiveled in the top thereof, an electric car, means slidably connecting said tube to said electric car, and means disposed in operative connection with said dummy car for conveying electric current to a point in said electric car, as set forth.

In testimony whereof I affix my signature in presence of two witnesses.

GEORGE H. SOHN.

Witnesses:
 PERCY S. WEBSTER,
 FRANK H. CARTER.